(12) United States Patent
Arnold et al.

(10) Patent No.: US 6,729,134 B2
(45) Date of Patent: *May 4, 2004

(54) VARIABLE GEOMETRY TURBOCHARGER HAVING INTERNAL BYPASS EXHAUST GAS FLOW

(75) Inventors: Steven Don Arnold, Rancho Palos Verdes, CA (US); Kevin P. Slupski, Redondo Beach, CA (US); Zandrie J. Wiersma, Redondo Beach, CA (US); Kelvin K. Bunsirisert, Irvine, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/178,754

(22) Filed: Jun. 24, 2002

(65) Prior Publication Data

US 2003/0014972 A1 Jan. 23, 2003

Related U.S. Application Data

(63) Continuation-in-part of application No. 10/090,864, filed on Mar. 4, 2002, and a continuation-in-part of application No. 09/761,277, filed on Jan. 16, 2001, now Pat. No. 6,419,464.
(60) Provisional application No. 60/360,727, filed on Mar. 1, 2002.

(51) Int. Cl.[7] ............................................. F02D 23/00
(52) U.S. Cl. ..................... 60/602; 415/144; 415/145; 415/164; 415/163
(58) Field of Search ............................ 60/602; 415/144, 415/145, 164, 163

(56) References Cited

U.S. PATENT DOCUMENTS

| 4,499,731 | A | * | 2/1985 | Moser | ......................... 60/602 |
|---|---|---|---|---|---|
| 4,679,984 | A | | 7/1987 | Swihart et al. | |
| 4,804,316 | A | | 2/1989 | Fleury | |
| 4,978,278 | A | * | 12/1990 | Kun | ............................ 415/144 |
| 5,311,749 | A | * | 5/1994 | McAuliffe et al. | ............. 415/22 |
| 5,855,117 | A | * | 1/1999 | Sumser et al. | ................. 60/602 |
| 5,943,864 | A | * | 8/1999 | Sumser et al. | ................. 60/602 |
| 6,058,707 | A | | 5/2000 | Bischoff | |
| 6,067,798 | A | | 5/2000 | Okada et al. | |
| 6,067,799 | A | | 5/2000 | Heinitz et al. | |
| 6,089,018 | A | | 7/2000 | Bischoff et al. | |
| 6,134,888 | A | | 10/2000 | Zimmer et al. | |
| 6,134,890 | A | | 10/2000 | Church et al. | |
| 6,161,384 | A | | 12/2000 | Reinbold et al. | |

(List continued on next page.)

FOREIGN PATENT DOCUMENTS

| DE | 3101131 A1 | * | 8/1982 | ............. F02C/9/18 |
|---|---|---|---|---|
| JP | 56083517 A | * | 7/1981 | ........... F02B/37/12 |

OTHER PUBLICATIONS

U. S. patent application Ser. No. 10/090,864, Steven Don Arnold, filed Mar. 4, 2002.

*Primary Examiner*—Thomas Denion
*Assistant Examiner*—Thai-Ba Trieu
(74) *Attorney, Agent, or Firm*—Ephraim Starr; Grant Langton

(57) ABSTRACT

Variable geometry turbochargers include a turbine housing having an exhaust gas inlet and outlet, a volute connected to the inlet, and typically a nozzle wall adjacent the volute. The turbine housing includes a bypass exhaust gas flow port disposed internally therein having an inlet opening positioned upstream from the turbine wheel, and a outlet opening positioned downstream from the turbine wheel. The inlet opening is exposed for facilitating bypass exhaust gas flow through the turbocharger when a respective vane is actuated or moved into an open position. The turbine housing may also include a specially configured nozzle wall terminal edge designed to work with vanes having a recessed underside surface to permit additional bypass exhaust gas flow within the turbocharger when the vanes are actuated in an open position.

15 Claims, 10 Drawing Sheets

U.S. PATENT DOCUMENTS

| | | |
|---|---|---|
| 6,233,934 B1 | 5/2001 | Church et al. |
| 6,256,993 B1 | 7/2001 | Halimi et al. |
| 6,269,642 B1 | 8/2001 | Arnold et al. ................ 60/602 |
| 6,272,859 B1 | 8/2001 | Barnes et al. |
| 6,314,736 B1 | 11/2001 | Daudel et al. ................ 60/602 |
| 6,338,250 B1 | 1/2002 | Mackay |
| 6,397,597 B1 | 6/2002 | Gartner |
| 6,419,464 B1 | 7/2002 | Arnold ........................ 60/602 |

* cited by examiner

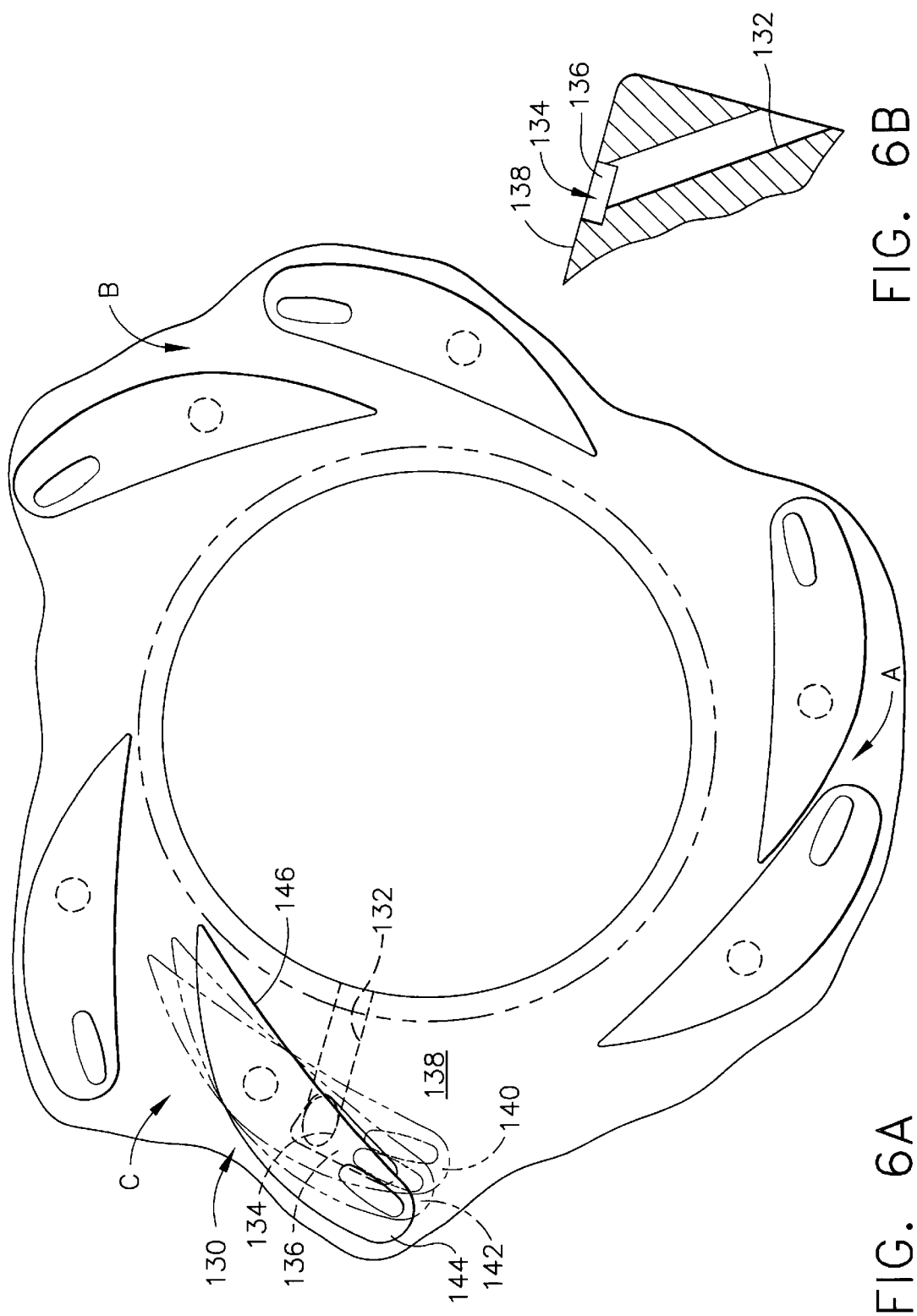

VARIABLE GEOMETRY TURBOCHARGER HAVING INTERNAL BYPASS EXHAUST GAS FLOW

RELATION TO COPENDING PATENT APPLICATIONS

This patent application: (a) is a continuation-in-part of U.S. patent application Ser. No. 09/761,277 filed on Jan. 16, 2001, now Pat. No. 6,419,464; (b) is a continuation-in-part of U.S. patent application Ser. No. 10/090,864, filed on Mar. 4, 2002 (the application Ser. No. 10/090,864 is a continuation-in-part of Ser. No. 09/761,277 and claims the benefit of U.S. Provisional Patent Application Serial No. 60/360,727, filed on Mar. 1, 2002); and (c) claims the benefit of U.S. Provisional Patent Application Serial No. 60/360,727, filed on Mar. 1, 2002.

FIELD OF INVENTION

This invention relates generally to the field of variable geometry turbochargers and, more particularly, to a variable geometry turbocharger that is specially constructed to provide internal bypass exhaust gas flow for purposes of eliminating the need for an external wastegate.

BACKGROUND OF THE INVENTION

Turbochargers for gasoline and diesel internal combustion engines are devices known in the art that are used for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing.

The exhaust gas-driven turbine is mounted onto one end of a shaft that is common to a radial air compressor mounted onto an opposite end of the shaft and housed in a compressor housing. Thus, rotary action of the turbine also causes the air compressor to spin within a compressor housing of the turbocharger that is separate from the turbine housing. The spinning action of the air compressor causes intake air to enter the compressor housing and be pressurized or boosted a desired amount before it is mixed with fuel and combusted within the engine combustion chamber.

In a turbocharger it is often desirable to control the flow of exhaust gas to the turbine to improve the efficiency or operational range of the turbocharger. Variable geometry turbochargers (VGTs) have been configured to address this need. A type of such VGT is one having a variable exhaust nozzle, referred to as a variable nozzle turbocharger. Different configurations of variable nozzles have been employed to control the exhaust gas flow. One approach taken to achieve exhaust gas flow control in such VGTs involves the use of multiple pivoting vanes that are positioned annularly around the turbine inlet. The pivoting vanes are commonly controlled to alter the throat area of the passages between the vanes, thereby functioning to control the exhaust gas flow into the turbine.

Turbocharged high speed diesel and gasoline engines are known to produce excess exhaust energy at high speed, when compared to the power that is demanded by the turbocharger turbine. Thus, such turbocharged engines (comprising VGTs or conventional non-variable geometry turbochargers) are known to include a wastegate valve for purposes of controlling the maximum amount of exhaust gas that is routed to the turbocharger turbine under high speed engine operating conditions.

Wastegate valves known in the art are packaged external from the turbocharger, and are typically constructed to divert or bypass exhaust gas flow exiting the engine away from the turbocharger under high speed engine operating conditions. As noted above, this bypassing of the exhaust flow to the turbocharger turbine is desired and necessary for purposes of controlling the maximum amount of boost pressure provided by the turbocharger, so as to not damage the engine.

Because such conventional wastegate valves exist and are mounted separately from the turbocharger, they present several engineering and design challenges. One such challenge relates to placement and packaging, as such wastegate valves must be constructed for attachment with an engine exhaust system, and be configured for spatially compatible placement within or adjacent the engine compartment.

Another challenge relates to proper operation, as such wastegates must be actuated, controlled, and coordinated with the operation of both the vehicle engine and the turbocharger. This task is especially complicated when dealing with a VGT, that itself includes variable geometry members that require special actuation and control. While such conventional external wastegate valves are widely used, the above-noted challenges that are inherent with these wastegate valves add both cost and complexity to the task of controlling turbocharged engine operation.

It is, therefore, desirable, that an exhaust bypass device or mechanism be constructed for use with a VGT in a manner that minimizes and/or eliminates the above-noted challenges relating to packaging and operation. It is desired that such exhaust bypass device or mechanism be constructed in such a manner as to minimize manufacturing costs, and preferably utilize existing turbocharger structures and parts. It is further desired that such exhaust bypass device or mechanism function in a manner that does not compromise, and that preferably increases, turbocharger operation efficiency when compared to using a conventional wastegate.

SUMMARY OF THE INVENTION

Variable geometry turbochargers, constructed according to the principles of this invention, comprise a turbine housing having an exhaust gas inlet and outlet, a volute connected to the inlet, and a nozzle wall adjacent the volute. A turbine wheel is carried within the turbine housing and is attached to a shaft. A plurality of movable vanes are disposed within the turbine housing adjacent the nozzle wall, and are positioned between the exhaust gas inlet and turbine wheel.

The turbine housing of such variable geometry turbocharger comprises a bypass exhaust gas flow port disposed internally therein having an inlet opening positioned upstream from the turbine wheel, and an exhaust outlet opening positioned downstream from the turbine wheel. The vanes are positioned adjacent respective bypass ports such that the inlet opening for each port is at least partially covered by a respective vane depending on vane location, e.g., when the vane is placed in a closed position. The bypass port inlet opening is exposed for facilitating bypass exhaust gas flow through the turbocharger when the respective vane is actuated or moved into an open position.

The turbine housing may also comprise a specially configured nozzle wall terminal edge to permit additional bypass exhaust gas flow within the turbocharger. In such embodiment, the nozzle wall terminal edge is modified to facilitate exhaust gas passage from the turbine housing volute to an underneath portion of the movable vanes when the vanes are in an open position. One or more of the vanes for use in this embodiment includes means for channeling or routing gas through the vane itself to the bypass exhaust port to provided increased exhaust gas flow capacity.

The vanes used with variable geometry turbochargers of this invention each comprise an inner airfoil surface oriented adjacent the turbine wheel, and an outer airfoil surface oriented opposite the inner airfoil surface. The inner and outer airfoil surfaces define a vane airfoil thickness. A vane leading edge or nose is positioned along a first inner and outer airfoil surface junction, and a vane trailing edge positioned along a second inner and outer surface junction. The vane includes a hole disposed within a first axial vane surface substantially parallel to outer nozzle wall for receiving a respective post therein that projects outwardly from the nozzle wall. Each vane also includes an actuation tab that extends from a second axial vane surface opposite from the first vane surface.

These vanes preferably have an airfoil thickness that is greater than conventional "slim" vanes. In an example embodiment, such preferred vanes have an airfoil thickness that is greater than about 0.16 times a length of the vane as measured between the vane leading and trailing edges.

BRIEF DESCRIPTION OF THE DRAWINGS

The invention will be more clearly understood with reference to the following drawings wherein:

FIG. 6A is a top schematic view of vanes disposed on a turbine nozzle wall in a variable geometry turbocharger of this invention in different vane operating positions;

FIG. 6B is a cross-sectional partial side elevation of a bypass exhaust gas flow port taken from the variable geometry turbocharger of FIG. 5;

DETAILED DESCRIPTION OF THE INVENTION

The invention, constructed in accordance with the principles of this invention, comprises a variable geometry turbocharger (VGT) having one or more internal exhaust gas bypass ports disposed therein that are placed into operation by movement of respective movable vanes. Constructed in this manner, the VGTs of this invention eliminate the need to use a conventional external wastegate to control excess exhaust gas flow to the turbine at high speed engine operating conditions, thereby eliminating exhaust system attachment and engine compartment fitment concerns, and further eliminating concerns related to actuating, controlling, and coordinating operation of an external wastegate based on engine and turbocharger operating conditions.

A VGT generally comprises a center housing having a turbine housing attached at one end, and a compressor housing attached at an opposite end. A shaft is rotatably disposed within a bearing assembly contained within the center housing. A turbine or turbine wheel is attached to one shaft end and is disposed within the turbine housing, and a compressor impeller is attached to an opposite shaft end and is disposed within the compressor housing. The turbine and compressor housings are attached to the center housing by bolts that extend between the adjacent housings.

Figure 1:
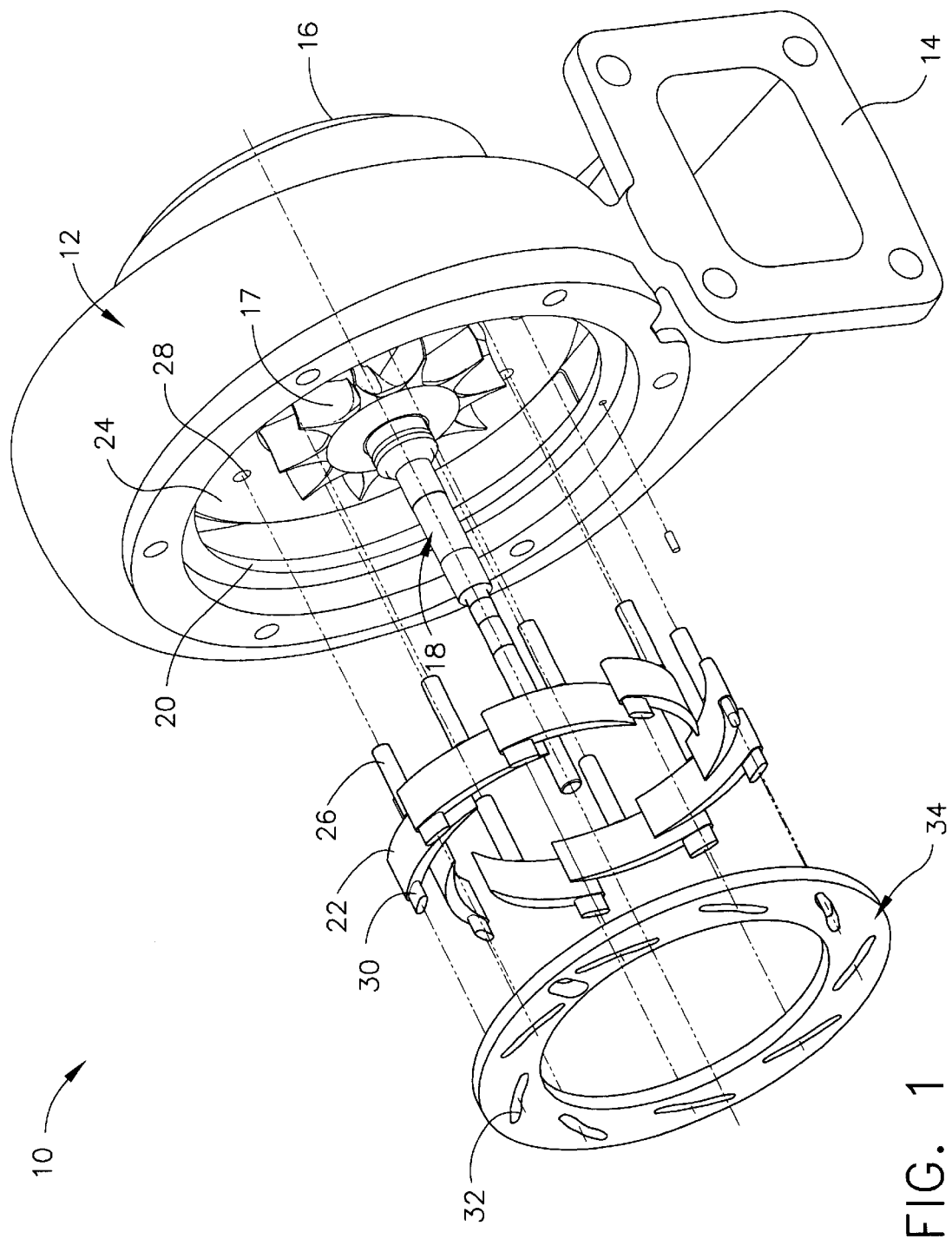
FIG. 1 is an exploded isometric view of a turbine housing for a variable geometry turbocharger employing movable vanes.

FIG. 1 illustrates a portion of a known VGT 10 comprising a turbine housing 12 having a standard inlet 14 for receiving an exhaust gas stream, and an outlet 16 for directing exhaust gas to the exhaust system of the engine. A volute is connected to the exhaust inlet and an integral outer nozzle wall is incorporated in the turbine housing casting adjacent the volute. A turbine wheel 17 and shaft assembly 18 is carried within the turbine housing 12. Exhaust gas, or other high energy gas supplying the turbocharger, enters the turbine housing through the inlet 14 and is distributed through the volute in the turbine housing for substantially radial delivery to the turbine wheel through a circumferential nozzle entry 20.

Multiple vanes 22 are mounted to a nozzle wall 24 machined into the turbine housing using shafts 26 that project perpendicularly outwardly from the vanes. The vanes conventionally used in such a VGT are of the slim airfoil thickness design mentioned above. The shafts 26 are rotationally engaged within respective openings 28 in the nozzle wall. The vanes each include actuation tabs 30 that project from a side opposite the shafts and that are engaged by respective slots 32 in a unison ring 34, which acts as a second nozzle wall.

An actuator assembly (not shown) is connected with the unison ring 34 and is configured to rotate the ring in one direction or the other as necessary to move the vanes radially outwardly or inwardly, respectively, to increase or decrease the amount of exhaust gas flow to the turbine. As the unison ring is rotated, the vane tabs 30 are caused to move within their respective slot 32 from one slot end to an opposite slot end. Since the slots are oriented radially along the unison ring, the movement of the vane tabs 30 within the respective slots 32 causes the vanes to pivot via rotation of the vane shafts within their respective openings and move radially outwardly or inwardly depending on the unison ring rotational direction. Examples of known VGTs comprising such elements are disclosed in U.S. Pat. Nos. 4,679,984; 4,804,316; and 6,269,642 which are each incorporated herein by reference.

Figure 2:
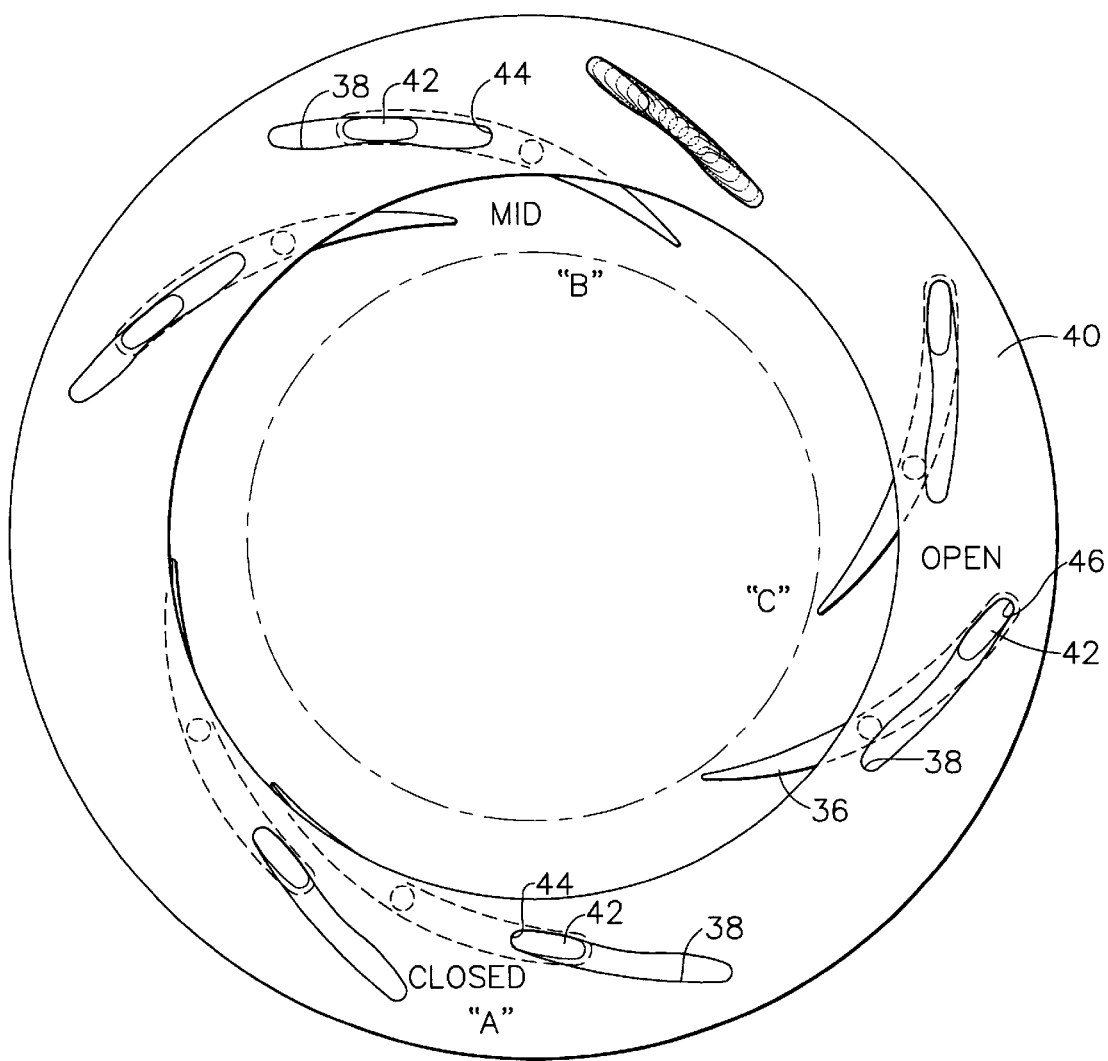
FIG. 2 is a top view of a unison ring with slots showing engagement with tabs of stemless slim vanes in different vane operating positions.

FIG. 2 illustrates the general movement pattern of conventional slim vanes 36, as used in the VGT described and illustrated above, when actuated by the unison ring. This movement pattern however, is generally the same for both the known slim vane configurations and the improved vane design prepared according to principles of this invention as used with VGTs. Each vane tab 42 is disposed within a respective elongated slot 38 of a unison ring 40. In a closed position "A", the vane tab 42 is positioned adjacent a first end 44 of the slot 38. This position is referred to as a closed position because the vane is not flared radially outward, thereby serving to limit the flow of exhaust gas to the turbine. At an intermediate position "B" the unison ring 40 has been rotated a sufficient amount such that the vane tab 42 is moved within the slot 38 away from the first slot end 44 towards a middle position of the slot.

The vane tab movement is provided by the pivoting action of the vane relative to the nozzle wall, allowing the vane to be rotated radially outwardly a given extent. At position "B", the intermediate radial projection of the vane serves to increase the flow of exhaust gas to the turbine when compared to closed position "A". At position "C", the unison ring has now been rotated to a maximum position, causing the vane tab 42 to be moved within the slot 38 to a second end 46. Again, such further vane movement is facilitated by the pivoting arrangement between the vane and the nozzle wall, allowing the vane to be rotated radially outwardly to a maximum position. At position "C", the maximum radial projection of the vane serves to increase the flow of exhaust gas to the turbine when compared to the intermediate position "B".

As mentioned above in the background, proper operation of known VGTs, comprising the plurality of movable vanes as described above and illustrated in FIG. 1, requires that the vanes be permitted to pivot freely vis-a-vis the nozzle wall when actuated by the unison ring. Such free pivoting movement requires that the vane shafts not bind or otherwise be restricted in their rotational movement within their respective nozzle holes. The known vane design can produce impairments to free pivoting vane movement if the shaft projecting from each vane is not perfectly perpendicular. Additionally, the known vane design can produce an impairment to free pivoting vane movement by the relatively high cantilever load stress imposed on the vane by virtue of the vane shaft and hole attachment mechanism.

Figure 3:
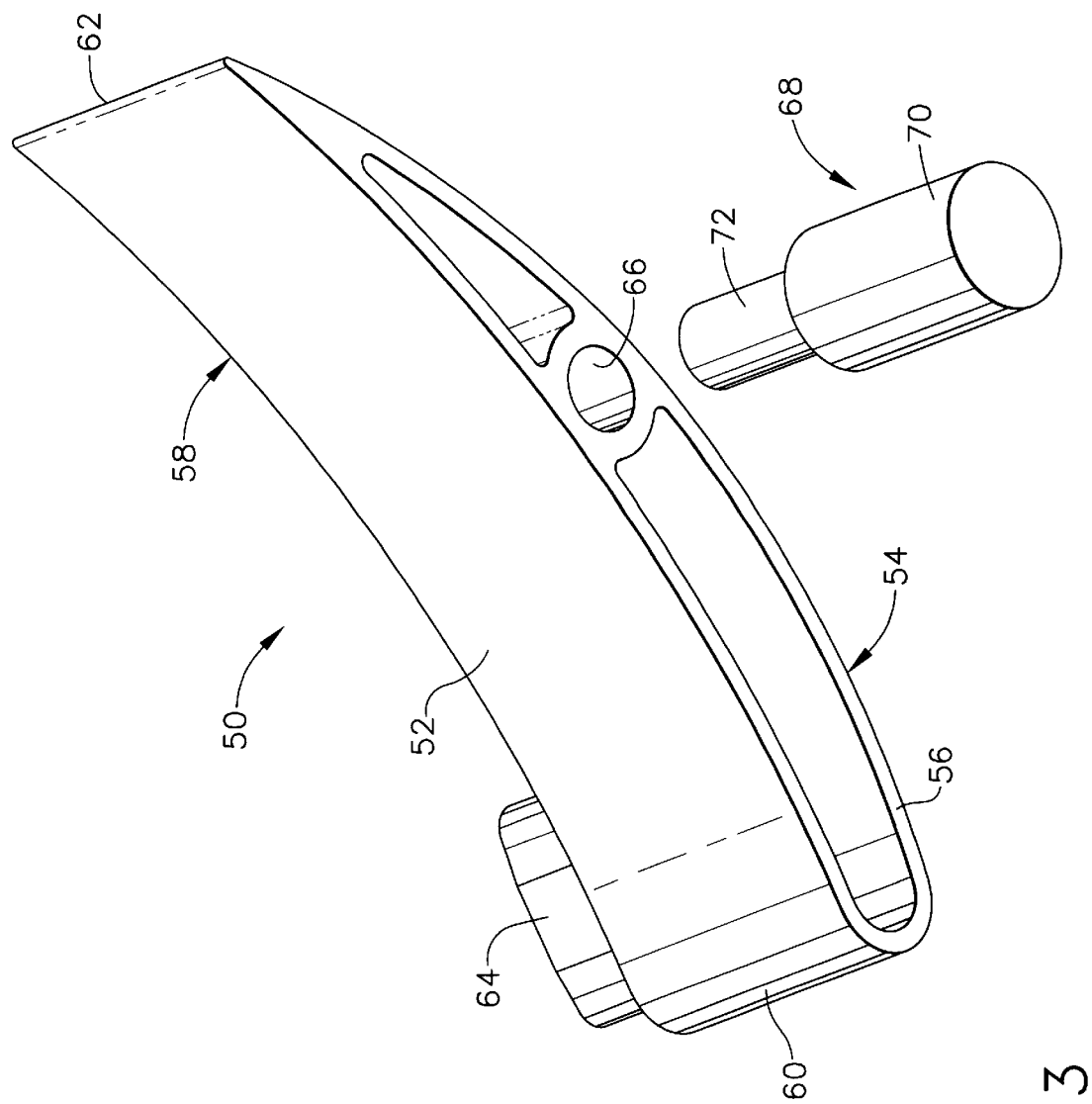
FIG. 3 is a detailed view of the stemless slim vane of FIG. 2.

FIG. 3 illustrates a "shaftless" or "stemless" vane 50 comprising an inner radial surface 52, an opposite outer radial surface 54, and axial surfaces 56 and 58. These vane surfaces are defined relative to the vane placement within the turbine housing. The vane 50 includes a leading edge or nose 60 and a trailing edge 62 at opposite common ends of the inner and outer radial surface 52 and 54. As used herein, the term leading edge is used to refer to a rounded nose portion of the vane, and need not be a sharp or abruptly angled surface feature. The vane includes a tab 64 projecting outwardly away from the axial surface 58 and positioned adjacent the leading edge 60, which tab is configured to cooperate with a unison ring slot in the manner described above to facilitate vane actuation.

Unlike the known vane design described above and illustrated in FIGS. 1 and 2, vane 50 does not include a shaft. Rather, vane 50 is designed having a hole 64 disposed within the axial surface 56 that is sized and configured to accommodate placement of a respective post 68 therein (see FIG. 3), wherein the post projects perpendicularly outwardly away from the turbine housing nozzle wall. Configured in this manner, vane pivoting movement vis-a-vis the nozzle wall is provided by the relative rotational motion between the fixed post and the hole in the vane. The pivoting mechanism provided by the fixed wall post disposed in the rotatable vane hole reduces the amount of cantilever load stress on the vane, when compared to known vane designs and attachment mechanisms, thereby serving to reduce and/or eliminate potential impairments to efficient vane movement and operation.

Each post 68 can be configured to be attached to the nozzle wall by pressed fit or other conventional attachment method, and is positioned within the nozzle wall in a substantially circular pattern the coincides with the desired spaced apart vane arrangement. In an example embodiment, the post 68 is configured having a stepped design with two different diameters, wherein a first enlarged diameter section 70 is sized and configured to provide a secure pressed fit attachment within the nozzle wall, and wherein a second reduced diameter section 72 is sized and configured to project outwardly from the nozzle wall and fit within the vane hole 66 to provide rotational movement therewith. However, the post can be of a uniform diameter, i.e., be of a non-stepped design.

VGTs of this invention can comprise either type of vane described above. For example, VGTs of this invention can comprise vanes similar to that illustrated in FIG. 1, having a stem or shaft projecting outwardly therefrom for fitment into a complementary opening in the turbine nozzle wall, or can include vanes similar to that illustrated in FIG. 3 (and other later described figures), having a shaftless or stemless design. In a preferred embodiment, VGTs of this invention comprise vanes having the shaftless or stemless configuration.

The vane 50 is configured having a relatively slim airfoil thickness, as measured between the inner and outer radial surfaces 52 and 54. For example, in one embodiment where the vane length is approximately 52 mm (as measured along a straight line between the vane leading edge and the vane trailing edge), the airfoil thickness was approximately 5 mm, or less than 0.1 times the length. In example embodiments, the airfoil thickness for such slim vane design is less than about 0.14 times the length of the vane, e.g., in the range of from about 0.05 to 0.14 the length of the vane.

The relatively thin airfoil thickness for the vane 50 is a result of the relatively gradually curved airfoil outer and inner vane surfaces 54 and 52. The vane 50 is characterized as having a continuous convex-shaped outer surface defined by a relatively large radius of curvature, and a continuous concave-shaped inner surface defined by a similarly large radius of curvature. The vane outer surface 54 radius of curvature for such slim vane design can be greater than about 0.8 times the length of the vane, e.g., can be in the range of from about 0.8 to 1.5 the length of the vane. The vane inner surface 52 radius of curvature for such slim vane design can be greater than 1 times the length of the vane, e.g., in the range of from about 1 to 1.8 the length of the vane. For example, in one embodiment where the vane length is approximately 52 mm, the vane outer surface 54 has a radius of curvature that is approximately 57 mm, and the vane inner surface 52 has a radius of curvature of 68 mm. Additionally, the vane leading edge 60 of such vane 50 has an abruptly rounded shape that is defined by a relatively small radius.

Figure 4:
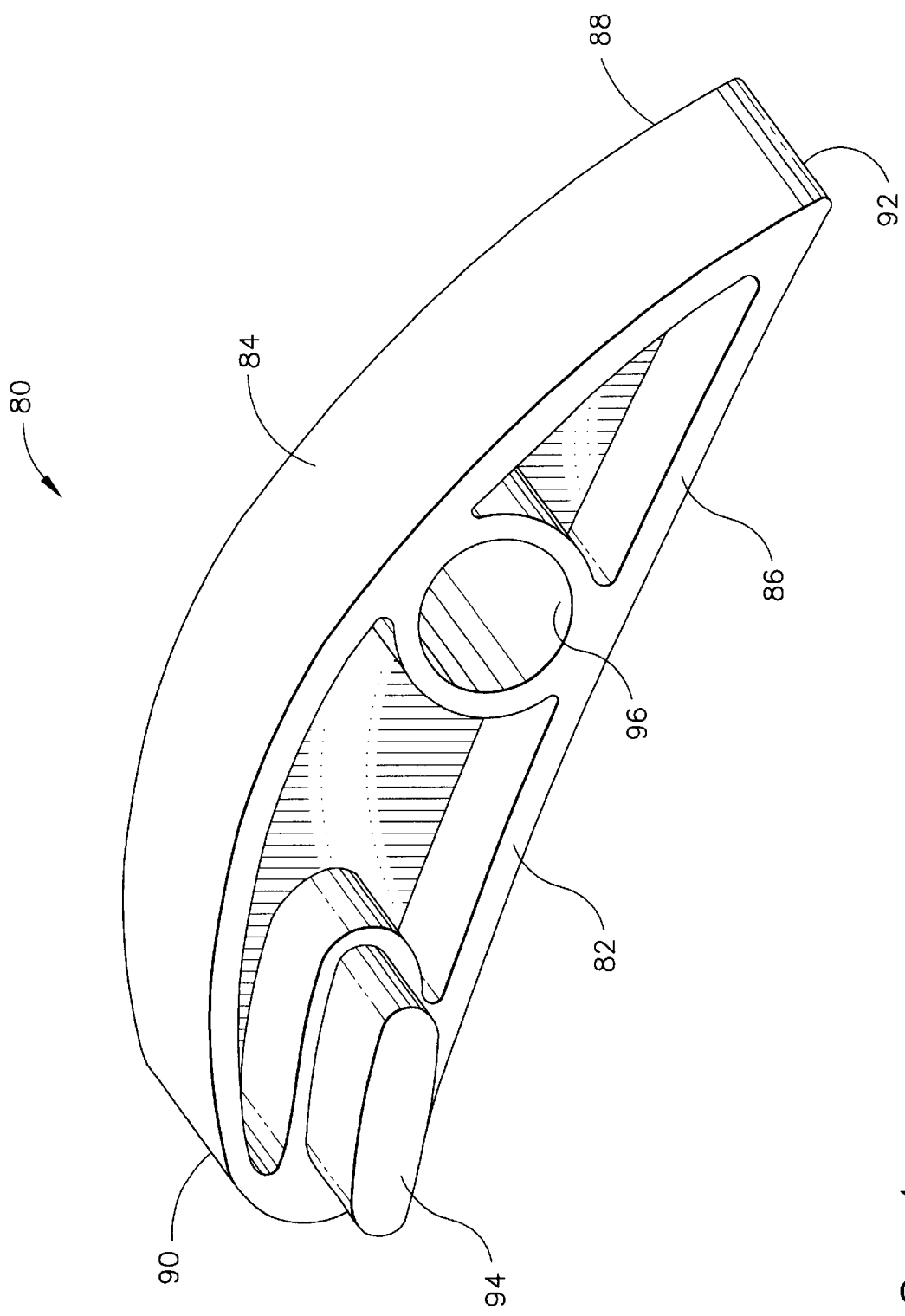
FIG. 4 is a detailed view of an improved vane that is used with the variable geometry turbocharger constructed according to principles of this invention.

FIG. 4 illustrates a vane 80 useful for fitment within VGTs of this invention comprising, like vane 50 described above and illustrated in FIG. 3, an inner radial surface 82, an opposite outer radial surface 84, axial surfaces 86 and 88, leading edge or nose 90, trailing edge 92, actuating tab 94, and post hole 96. Vane 80 is generally configured in the same manner as vane 50 to cooperate with the unison ring and turbine housing and be rotated within the turbine housing to control exhaust gas flow to the turbine wheel.

Unlike the slim vane 50, vane 80 has an airfoil profile and an airfoil thickness that is different from, e.g., generally thicker than, that of the slim vane. The vane 80 includes an outer surface 84 having an increased degree of radial curvature, i.e., a reduced radius of curvature, when compared to a conventional slim airfoil thickness vane. The reduced radius of curvature provides an outer airfoil profile having an exaggerated curve when compared to the relatively gradually curved outside surface of the conventional slim vane. This reduced radius of curvature also operates to increase the radial or airfoil thickness of the vane.

In an example embodiment, a vane useful for fitment within a VGT of this invention can have an airfoil or radial thickness (as measured between the furthest separation or thickest portion of the vane between the radial inner and radial outer surfaces) that can be greater than about 0.16 the length of the vane, e.g., in the range of from about 0.16 to 0.50 the length of the vane (as measured by a straight line between the vane leading and trailing edges). In one example, where the vane length is approximately 47 mm, the airfoil thickness is approximately 12 mm or 0.25 times the vane length. It is to be understood, that the exact airfoil thickness of improved vanes of this invention can and will vary within this general range depending on the particular VGT and engine application.

As mentioned above, vane 80 comprises an outer airfoil surface 84 having a relatively small radius of curvature. In an example embodiment, the vane can have an airfoil outer surface defined by a radius of curvature that is less than about 0.8 times the vane length, e.g., from about 0.1 to 0.8 times the vane length. The vane 80 has an inner airfoil surface 82 that is almost linear in appearance, having a convex surface defined by a relatively large radius of curvature. In an example embodiment, the vane can have an airfoil inner surface defined by a radius of curvature that is greater than about 2 times the vane length. For example, in one embodiment where the vane length is approximately 47 mm, the vane outer surface 84 has a radius of curvature that is approximately 28 mm, and the vane inner surface 82 has a radius of curvature of approximately 207 mm.

Additionally, vane 80 has a leading edge 90 that is characterized by a relatively large radius of curvature when contrasted with the conventional slim airfoil vane for purposes of minimizing the incidence effects through the flow range of the vane. Generally so-described vane operates to utilize the blockage effect of an extremely thick airfoil to create a higher area turndown for a fixed amount of vane rotation. The increased thickness of an airfoil in a cascade has a much higher impact on throat area in the "vanes closed" position than it does in the "vanes open" position. By significantly increasing the thickness of the vane, and slightly increasing the axial width of the vane, the same maximum throat area is achieved.

As the vanes rotate closed, the throat area reduces at a higher rate. The additional benefit of this is that for a fixed area turndown, less rotation of the vane is required. Reduced rotation of the vanes results in less deviation from the optimum flow vector (around 70 degrees from radial), thus improving off-design efficiency.

As will be better described below, in addition to the above-noted aerodynamic and mechanical efficiencies provided by the increased airfoil thickness stemless vane design, vanes configured in this manner provide a sufficient airfoil thickness that operates to both expose and seal off respective exhaust bypass gas flow port openings in the nozzle wall during vane opening and closing movement.

Figure 5:
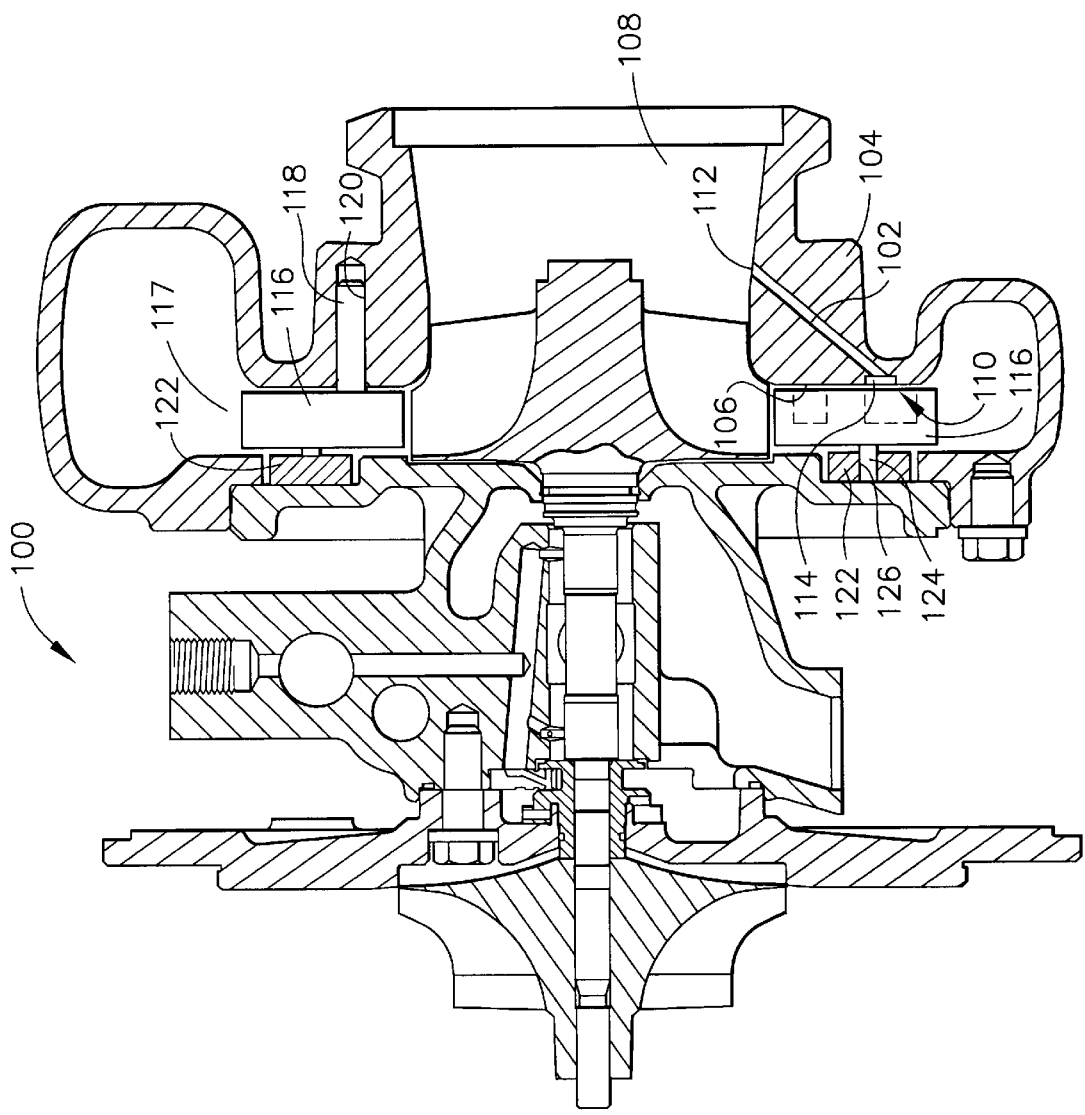
FIG. 5 is a cross sectional side elevation of a variable geometry turbocharger of this invention comprising the vanes of FIG. 4 and a bypass exhaust gas flow port.

FIG. 5 illustrates a VGT 100, constructed according to principles of this invention, comprising one or more internal bypass exhaust gas flow ports or passages 102 disposed integrally therein. Specifically, the bypass port 102 is disposed diagonally through a portion of the turbine housing 104 extending from the nozzle wall 106 to the turbine housing exhaust outlet 108. The exact diagonal angle of the bypass port through the turbine housing can and will vary depending on the particular turbocharger application for purposes of providing design flexibility. In an example embodiment, the bypass port is disposed through the turbocharger housing at an angle of approximately 25 degrees relative to an axis running through the turbine housing and parallel with the common shaft. The bypass port 102 includes an inlet opening 110 through the nozzle wall, and an outlet opening 112 through a wall defining the exhaust outlet. The bypass port opening 110 can be configured having an enlarged mouth for purposes of tailoring the opening, closing, and gas flow passage characteristics of the port.

A number of vanes 116 are movably disposed in the turbine housing 104 in the manner described above, e.g., in the throat 117 of the turbine housing between the volute and the turbine wheel. In a preferred embodiment, the vanes 116 are of the stemless design, and are each pivotably mounted into position adjacent the nozzle wall 106 by use of a respective shaft or post 118, that is fixedly attached at one end within a cavity 120 in the housing, and that is pivotably coupled at an opposite end to the respective vane. The vanes 116 are actuated within the turbine housing by a unison ring 122 coupled to each vane by a vane tab 124 in ring slot 126 arrangement.

FIG. 6A illustrates example vane pairings, disposed within the VGT of this invention described above and illustrated in FIG. 5, at closed position "A", at mid position "B", and at open position "C". Vane 130 is shown in each of the three above-noted positions as it relates to the bypass port 132 that is disposed through the turbine housing. As shown in FIGS. 6A and 6B, the bypass port inlet opening 134 is disposed through the nozzle wall 138 adjacent an underneath or shroud side of the vane 130. The opening 134 includes an enlarged mouth 136 that is formed from a recessed portion of the nozzle wall 138. It is to be understood that the opening mouth 136 can be configured in a variety of different shapes and sizes to provide the desired opening, closing, and gas flow passage characteristics of the exhaust bypass. Generally speaking, the opening mouth 136 is sized and shaped to seal off the bypass port when the vane is in a closed position, to provide some degree of bypass exhaust flow as the vane gets near the open position, and to provide a desired open area as a function of vane position for purposes of modulating exhaust bypass flow through the port.

Referring to FIG. 6A, when the vane 130 is in a closed position 140, the inlet opening mouth 136 is completely covered by the shroud side of the vane, thereby operating to prevent exhaust bypass gas flow through the port 132. When the vane is in a mid-opened position 142, the inlet opening mouth 136 is still completely covered, thereby operating to prevent exhaust bypass flow through the port 132. As the vane moves from the mid-opened position 142 to the open position 144, the vane inner surface 146 passes radially outwardly a sufficient distance to expose or uncover a portion of the inlet opening mouth 136, thereby enabling the desired passage of exhaust gas through the port 132.

The passage of exhaust gas through the port is referred to as bypass flow because the exhaust gas that is passed through the port exits the turbine housing without having contacted the turbine wheel, i.e., having "bypassed" the turbine wheel. This bypass exhaust flow is desired during high speed engine operating conditions, where the maximum amount of turbocharger assistance, i.e., intake airboost pressure, has been achieved to avoid engine damage. This occurs when the vanes in the VGT are actuated and placed near or at a full open position.

Figure 7A:
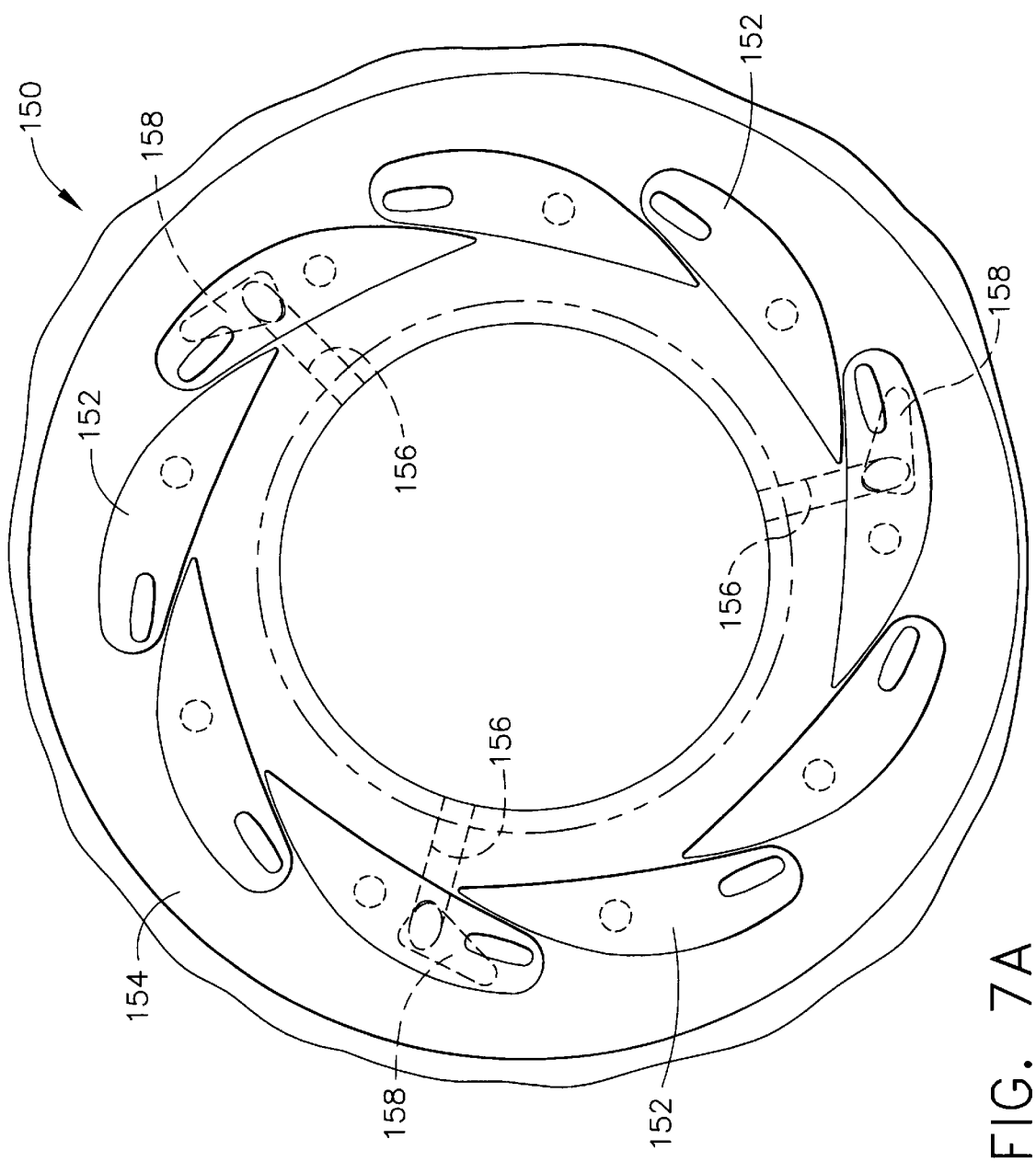
FIGS. 7A to 7C are each top schematic views of vanes disposed on a turbine nozzle wall in a variable geometry turbocharger of this invention in different vane operating positions.
Figure 7B:
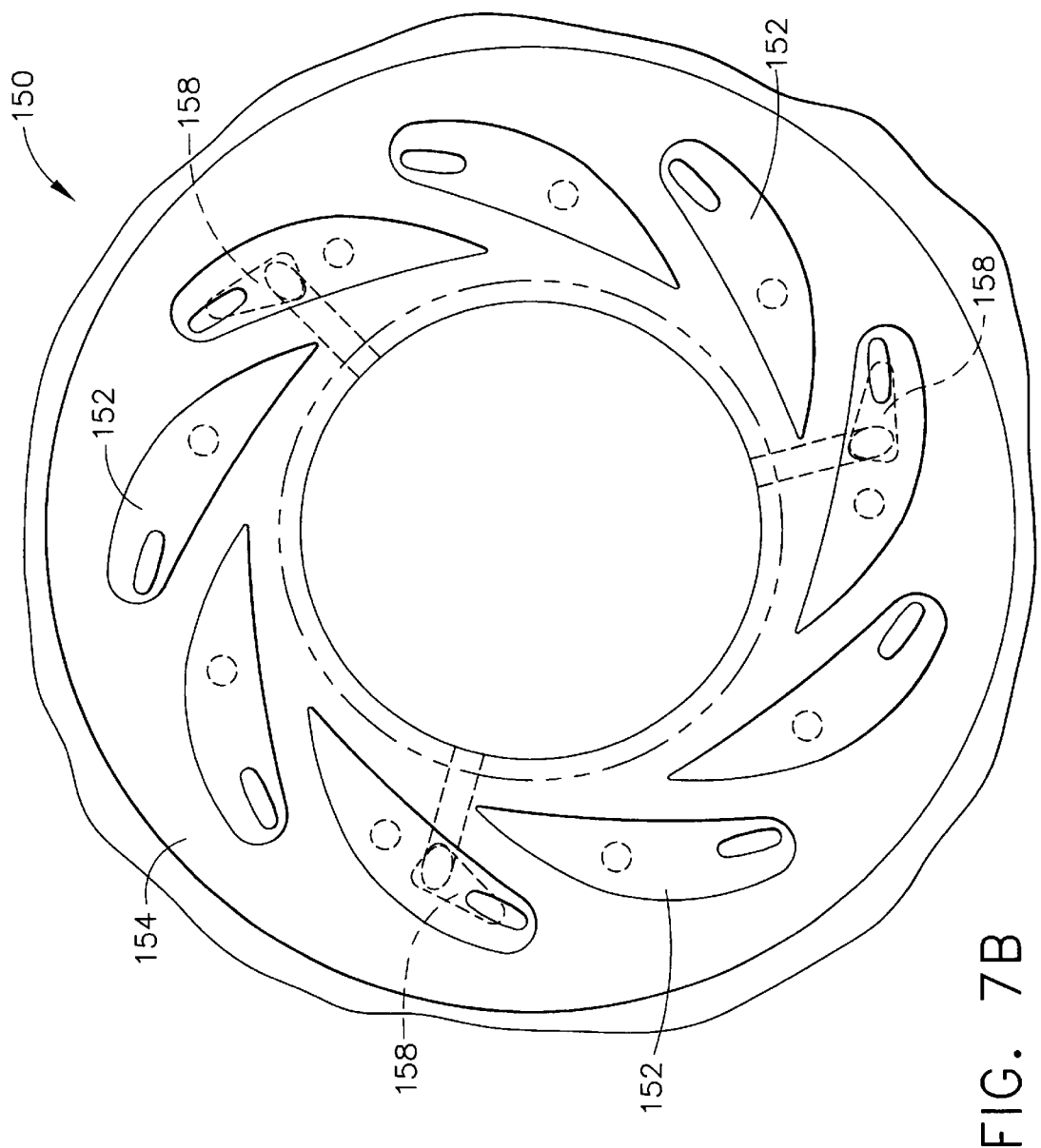
Figure 7C:
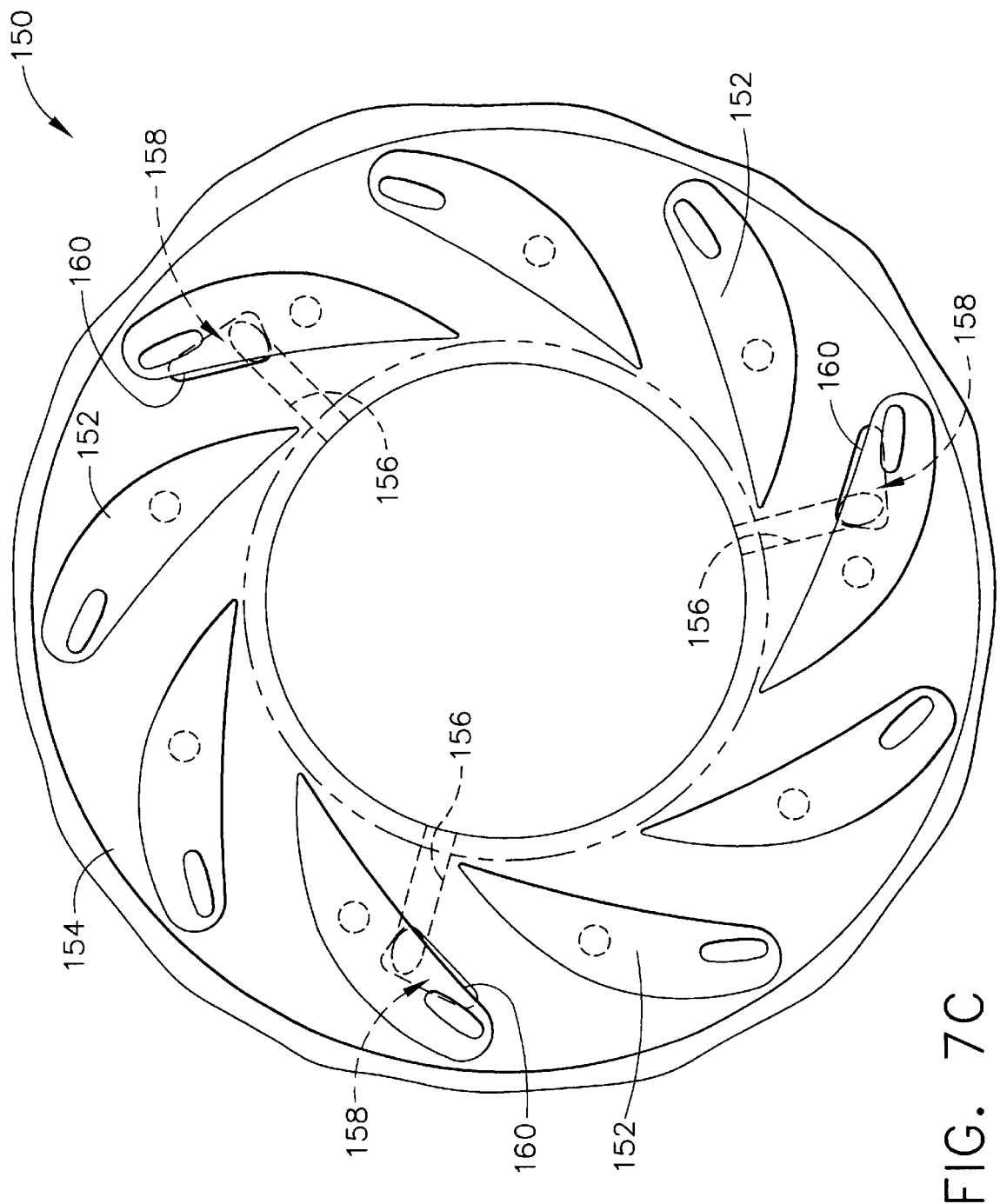

FIGS. 7A to 7C illustrate an assembly of vanes disposed on a turbocharger turbine housing nozzle wall in different vane operating positions. FIG. 7A shows an assembly 150 comprising a number of movable vanes 152 positioned concentrically around a turbine wheel (not shown), and actuated in a closed position, thereby restricting the flow of exhaust gas to the turbine wheel. The vanes are each mounted onto a turbine housing nozzle wall 154 in the manner described, which also comprises a number of bypass exhaust gas flow ports 156 extending therethrough and to an exhaust outlet in the turbine housing. As described above, each bypass flow port 156 includes a mouth 158 at the opening through the nozzle wall. As shown in this illustration, when the vanes 152 are operated in a closed position, the bypass flow port 156 and mouth 158 are covered and sealed by the vanes, thereby operating to prevent the bypass flow of exhaust gas therethrough.

FIG. 7B shows the same assembly 150 of vanes 152 disposed along the turbine housing nozzle wall 154 as shown in FIG. 7A, except that the vanes are now actuated into a semi-opened position to permit a partial passage of exhaust gas to the turbine wheel. However, in the semi-opening position the vanes 152 are not pivoted a sufficient amount radially outwardly away from the turbine wheel to uncover a portion of the respective bypass flow port mouths 158, thereby still operating to prevent bypass exhaust gas flow through the bypass exhaust gas flow ports 156.

FIG. 7C shows the same assembly 150 of vanes 152 disposed along the turbine housing nozzle wall 154 as shown in FIGS. 7A and 7B, except that the vanes are now actuated into a fully opened position to permit the fully passage of exhaust gas to the turbine wheel. When placed in the full opened position, the vanes 152 are pivoted to a maximum degree radially outwardly away from the turbine wheel to uncover a portion 160 of the respective bypass flow port mouths 158, thereby operating to permit bypass exhaust gas flow through the bypass exhaust gas flow ports 156.

When the portion 160 of each bypass exhaust gas flow port mouth 158 is uncovered, additional flow of exhaust gas is routed through each of the bypass ports 156 and around the turbine wheel. Thus, when the exhaust has excess energy beyond the turbine requirement with the vanes near or at the full open position, some portion of the flow can be routed around the turbine stage. A feature of VGTs configured in this manner, comprising the bypass flow ports, is that it permits design flexibility. For example, one can choose the number of vanes matched to bypass flow ports, and the specific size and shape of each bypass flow port and respective mouth depending on the particular turbocharger application.

There are also several different methods that can be used to form bypass exhaust gas ports in VGTs of this invention. For example, an angled hole can be drilled as shown in FIGS. 5 and 6B, or a straight hole can be drilled into a cored annulus in the turbine outlet. These are but a few of the ways in which the bypass exhaust flow port can be formed and embodied in the turbine housing. Thus, although a vane assembly comprising only three bypass exhaust gas flow ports were shown in FIGS. 7A to 7C, it is to be understood that this was provided for purposes of reference, and was not intended to be limiting on the various embodiments of VGTs constructed in accordance with principles of this invention.

Additionally, the portion of the passage underneath each vane can be configured differently than described above and illustrated. Fundamentally, the passage should open as the vanes get near the open position, and there is some adjustment leeway to match the engine requirements. Additionally, the open area as a function of the vane position is an important design consideration for purposes of creating th modulation capability of the design.

Figure 8:
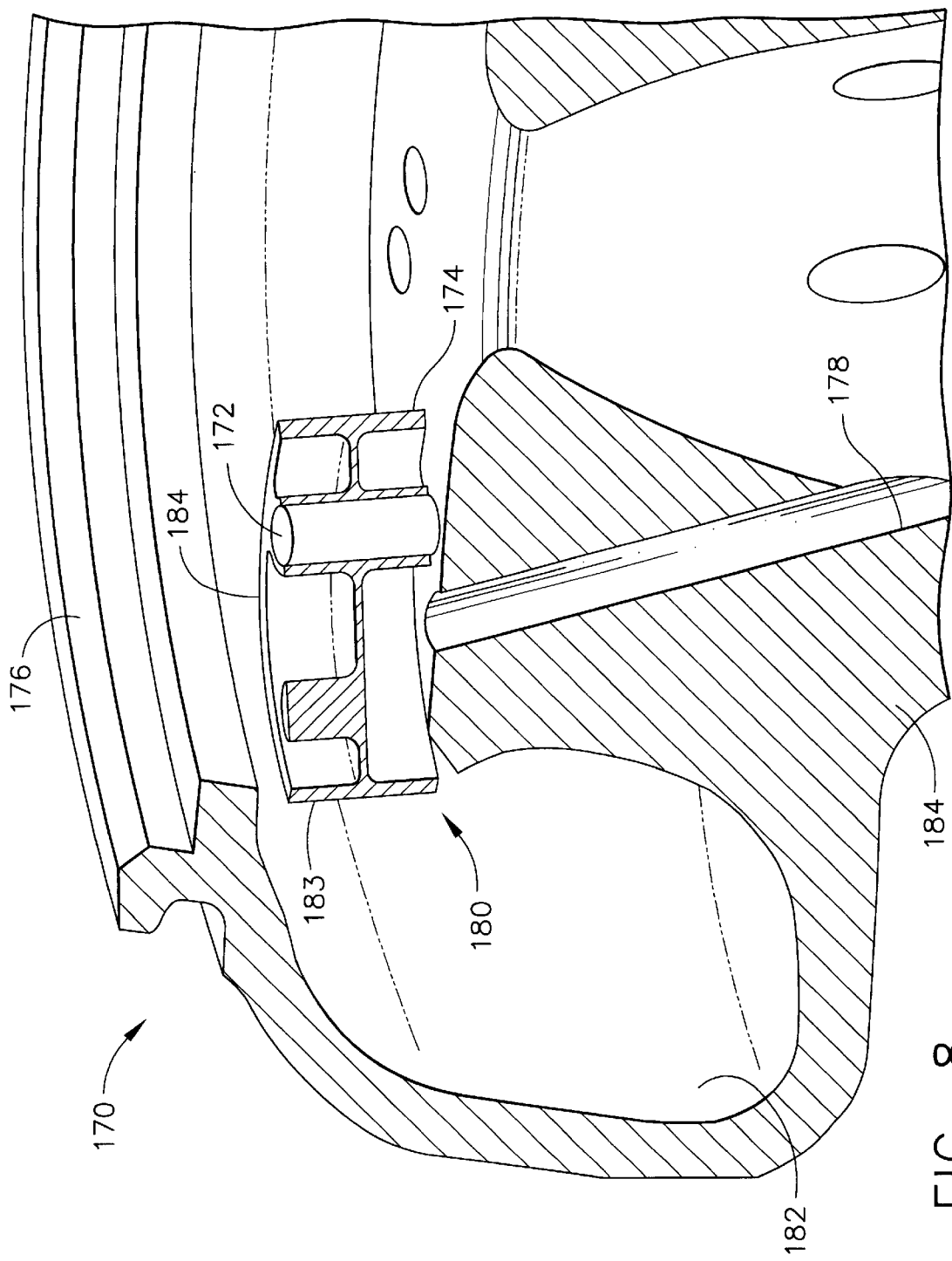
FIG. 8 is an enlarged perspective partial view of a variable geometry turbocharger turbine housing of this invention having an additional bypass exhaust gas flow path.

FIG. 8 illustrates a VGT embodiment 170 of this invention that has been specially constructed to provide increased bypass exhaust gas flow when compared to the VGT embodiments described above. The VGT 170 comprises the same general assembly of elements described above; namely, a number of movable vanes 172 that are disposed adjacent a nozzle wall 174 of a turbocharger turbine housing 176. At least one of the vanes 172 is positioned over an opening 178 of a bypass exhaust gas flow port 180 to control the bypass flow of exhaust gas therethrough during turbocharger operation.

However, in an effort to increase bypass exhaust gas flow internally through turbine housing, this VGT embodiment has been specially constructed to provide another exhaust gas flow path to the bypass port for the purposes of increasing bypass exhaust gas flow capability. Specifically, this VGT embodiment makes use of two construction features that together operate to provide this additional flow path. A first feature comprises a turbine nozzle terminal edge 182 that has been configured having downwardly angled surface that projects into the turbine volute. Configuring the nozzle terminal edge surface 182 in the this manner creates an exhaust gas flow path from the turbine volute to an underside or shroud side surface of the vane when the vane is actuated into a near open or open position such that a leading edge 183 of the vane 172 projects over the nozzle wall terminal edge 182 and into the volute.

The exact angle of departure for the nozzle wall terminal edge, relative to the nozzle wall, is understood to vary depending on the particular turbocharger application, and is useful for providing flexibility to the designing engineer for the purpose of achieving a desired increased bypass exhaust gas flow capability. A key design criteria, however, is that the nozzle terminal edge be configured such that an underside or shroud side surface 184 portion of the vane 172 be uncovered when the vane is actuated into a near open or open position. In an example embodiment, the nozzle wall terminal edge 182 is configured having surface that projects downwardly into the volute at an angle of approximately 30 degrees (relative to the plane of the nozzle wall surface).

As shown in FIG. 8, the other VGT construction feature that enables increased bypass exhaust gas flow is that the vane underside or shroud side surface 184 be configured to permit the passage of bypass exhaust gas from the turbine volute (when the leading edge of the vane is positioned off of the nozzle wall surface) to the bypass exhaust gas flow port 180. In an example embodiment, the vane 172 is configured having a recessed or cored out underside surface 184 that provides a channel or passage within the vane itself for routing bypass exhaust gas from the volute to the bypass flow port 180.

FIG. 8 shows an example vane 172 with its inner radial surface removed for the purpose of illustrating the recessed underside surface 184. Although it is to be understood that the exact configuration of the recessed portion can vary depending on the particular turbocharger application, a key feature is that the shape and size of the recessed or cored out portion is that is provide a channel within the vane for passing exhaust gas from a vane leading edge to an inner portion of the vane in communication with the bypass port.

In an example embodiment, the vane recessed portion is configured to occupy an underside section of the vane that is defined between inside surfaces of the vane leading edge, the vane post opening, and the vane inner and outer radial surfaces.

Configured in this manner, this VGT embodiment permits the additional flow of bypass exhaust gas through the vane itself. This additional exhaust gas flow can occur at the same time as, before, or after the vane has been actuated a sufficient distance such that its inner radial edge surface has exposed and permitted bypass exhaust flow to the bypass exhaust gas port in the manner described and illustrated above for the earlier VGT embodiment.

When the vanes in VGTs of this invention are operated in a closed position, or a non-fully opening position such that the vanes are positioned over each bypass flow port, it is important that the vanes operate to seal off the respective port. VGTs of this invention, and mechanisms used therein to provide such variable geometry operation, include parts that are manufactured with a high degree of precision to accurately control the vane side clearances, i.e., the clearance between axial side of the vane and the adjacent nozzle wall surface.

VGTs of this invention can also rely on aerodynamic forces that exist within the turbine housing during operation of the turbocharger to pull the unison ring onto the vanes, thus also operating to minimize vane side clearances. This feature can also be used to push the vanes onto the sealing surfaces around respective bypass exhaust gas port openings. Additionally, since the bypass exhaust gas ports are in gas flow communication with a downstream portion of the turbine housing, i.e., the exhaust outlet, a pressure differential is provided at each bypass port nozzle wall opening. This differential pressure has the desired effect of pulling the vanes down onto respective bypass port opening sealing surfaces, thereby further helping to minimize vane side clearance and provide good vane sealing.

VGTs of this invention, comprising such internal bypass exhaust gas flow ports, are intended to replace the need to provide an external mechanism, e.g., a wastegate valve, with the turbocharger for purposes of providing maximum turbocharger boost control. Thus, VGTs of the invention operate to eliminate the need of having to address attachment, packaging, and spatial challenges associated with conventional external wastegate valves. In addition, VGTs of this invention operate to eliminate the actuation and control challenges associated with having to coordinate proper wastegate valve operation with the turbocharger and vehicle engine operating conditions.

VGTs of this invention include parts and members that can be formed from the same types of materials, and by the same method (i.e., by machining or molding) as that used to form conventional VGTs. The vanes used in VGTs of this invention can have a substantially sold design or can be configured having a cored out design. In an example embodiment, such as that used to provide an additional bypass exhaust gas flow path, the vanes are configured having cored out axial surfaces. The cored out design is preferred as it has been found to provide better formability, a higher level of stiffness, be more cost effective to produce, and have a reduced mass when compared to conventional vanes.

Having now described the invention in detail as required by the patent statutes, those skilled in the art will recognize modifications and substitutions to the specific embodiments disclosed herein. Such modifications are within the scope and intent of the present invention.

What is claimed is:

1. A variable geometry turbocharger assembly comprising:
   a turbine housing having an exhaust gas inlet and an exhaust gas outlet, a volute connected to the inlet, and a nozzle wall adjacent the volute;
   a turbine wheel carried within the turbine housing and attached to a shaft;
   a plurality of movable vanes disposed within the turbine housing adjacent the nozzle wall between the exhaust gas inlet and turbine wheel, each vane having an airfoil thickness defined by an inner vane radial surface and an outer vane radial surface;
   a bypass exhaust gas flow port disposed through the turbine housing, the port having an inlet opening upstream from the turbine wheel, and a outlet opening downstream from the turbine wheel, the inlet opening being at least partially coverable by a respective vane depending on vane position.

2. The variable geometry turbocharger assembly as recited in claim 1 wherein the port inlet opening is disposed through the nozzle wall, and the port outlet opening is disposed through a wall forming the turbine housing exhaust gas outlet.

3. The variable geometry turbocharger assembly as recited in claim 2 wherein the port inlet opening has an enlarged surface area when compared to the port.

4. The variable geometry turbocharger assembly as recited in claim 1 wherein the gas flow port is configured such that at least a portion of the port becomes exposed to receive bypass exhaust gas when a respective vane is placed into an open position.

5. The variable geometry turbocharger assembly as recited in claim 1 wherein the nozzle wall includes a terminal edge positioned adjacent the volute that is configured to permit the passage of exhaust gas to an underside surface of a respective vane when the vane is placed into an open position.

6. The variable geometry turbocharger assembly as recited in claim 5 wherein the vane underside surface is configured to facilitate passage of exhaust gas from the nozzle terminal edge to the bypass exhaust gas flow port when the vane is placed into an open position.

7. The variable geometry turbocharger assembly as recited in claim 1 wherein each vane has an airfoil thickness in the range of from about 0.16 to 0.50 times a length of the vane.

8. A variable geometry turbocharger assembly comprising:
   a turbine housing having an exhaust gas inlet and an exhaust outlet, a volute connected to the inlet, and a nozzle wall adjacent the volute;
   a turbine wheel carried within the turbine housing and attached to a shaft;
   a plurality of vanes disposed within the turbine housing between the exhaust gas inlet and turbine wheel, each vane comprising:
      an inner airfoil surface oriented adjacent the turbine wheel;
      an outer airfoil surface oriented opposite the inner airfoil surface, the inner and outer airfoil surfaces defining a vane airfoil thickness;
      a leading edge positioned along a first inner and outer airfoil surface junction;
      a trailing edge positioned along a second inner and outer airfoil surface junction;

a first axial vane surface substantially parallel to the nozzle wall, the first axial vane surface having a hole for receiving a respective post therein, said post projecting from the nozzle wall towards the turbine wheel; and an actuation tab extending from a second axial vane surface opposite from the first vane surface;

a bypass exhaust gas flow port disposed through the turbine housing, the port having an inlet opening upstream from the turbine wheel, and a outlet opening downstream from the turbine wheel, the inlet opening being covered by a respective vane when the vane is placed in a closed position; and means for engaging each vane tab and rotating the vanes in unison within the turbine housing.

9. The variable geometry turbocharger assembly as recited in claim 8 wherein the port inlet opening is disposed through the nozzle wall, and the port outlet opening is disposed through a wall forming the turbine housing exhaust gas outlet.

10. The variable geometry turbocharger assembly as recited in claim 9 wherein the port inlet is in communication with an enlarged opening positioned at the nozzle wall.

11. The variable geometry turbocharger assembly as recited in claim 8 wherein the port is configured such that at least a portion of the port becomes exposed to receive bypass exhaust gas when a respective vane is placed into an open position.

12. The variable geometry turbocharger assembly as recited in claim 8 wherein the nozzle wall includes a terminal edge adjacent the volute that is configured to permit the passage of exhaust gas along the first axial vane surface of a respective vane when the vane is placed into an open position.

13. The variable geometry turbocharger assembly as recited in claim 12 wherein the first axial vane surface comprises means for facilitating passage of exhaust gas from the nozzle terminal edge to the bypass exhaust gas flow port when the vane is placed into an open position.

14. The variable geometry turbocharger assembly as recited in claim 8 wherein the vane inner airfoil surface comprises a convex surface adjacent the vane leading edge and a concave surface adjacent the trailing edge, and wherein the vane airfoil thickness is in the range of about 0.16 to 0.50 times the vane length as measured between the leading and trailing edges.

15. A variable geometry turbocharger assembly comprising:

a turbine housing having an exhaust gas inlet and an exhaust outlet, a volute connected to the inlet, and a nozzle wall adjacent the volute;

a turbine wheel carried within the turbine housing and attached to a shaft;

a plurality of vanes disposed within the turbine housing between the exhaust gas inlet and turbine wheel, each vane comprising:

an inner airfoil surface oriented adjacent the turbine wheel;

an outer airfoil surface oriented opposite the inner airfoil surface, the inner and outer airfoil surfaces defining a vane airfoil thickness;

a leading edge positioned along a first inner and outer airfoil surface junction;

a trailing edge positioned along a second inner and outer airfoil surface junction;

a first axial vane surface substantially parallel to the nozzle wall, the first axial vane surface including a hole for receiving a respective post therein, said post projecting from the nozzle wall towards the turbine wheel; and an actuation tab extending from a second axial vane surface opposite from the first vane surface;

a bypass exhaust gas flow port disposed internally through the turbine housing, the port having an inlet opening through the nozzle wall upstream from the turbine wheel, and an outlet opening through a portion of the turbine housing defining the exhaust outlet and downstream from the turbine wheel, the inlet opening being covered by a respective vane when the vane is placed in a closed position; and means for engaging each vane tab and rotating the vanes in unison within the turbine housing;

wherein the nozzle wall includes a terminal edge that is configured to expose a portion of the first axial vane surface when the vanes are actuated into an opened position, and wherein at least one of the vanes includes an first axial vane surface positioned adjacent the nozzle wall configured to direct exhaust gas from the nozzle wall terminal edge to the bypass port when the vane is actuated into an opened position.

* * * * *